(12) United States Patent
Katou et al.

(10) Patent No.: US 9,897,826 B2
(45) Date of Patent: Feb. 20, 2018

(54) OPTICAL MODULATOR

(71) Applicant: SUMITOMO OSAKA CEMENT CO., LTD., Tokyo (JP)

(72) Inventors: Kei Katou, Tokyo (JP); Norikazu Miyazaki, Tokyo (JP); Ryo Shimizu, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/468,116

(22) Filed: Mar. 24, 2017

(65) Prior Publication Data

US 2017/0276973 A1 Sep. 28, 2017

(30) Foreign Application Priority Data

Mar. 25, 2016 (JP) .................................. 2016-061202

(51) Int. Cl.
| | |
|---|---|
| *G02F 1/01* | (2006.01) |
| *G02F 1/03* | (2006.01) |
| *G02F 1/035* | (2006.01) |
| *G02F 1/225* | (2006.01) |
| *G02F 1/21* | (2006.01) |

(52) U.S. Cl.
CPC ............ *G02F 1/0327* (2013.01); *G02F 1/035* (2013.01); *G02F 1/0322* (2013.01); *G02F 1/225* (2013.01); *G02F 2001/212* (2013.01); *G02F 2201/58* (2013.01)

(58) Field of Classification Search
CPC ...... G02F 1/225; G02F 2001/212; G02F 1/01; G02F 1/035; G02F 1/0327; G02B 6/12007
See application file for complete search history.

(56) References Cited

U.S. PATENT DOCUMENTS

2003/0147591 A1 * 8/2003 Doi ....................... G02F 1/0123
385/39

FOREIGN PATENT DOCUMENTS

| JP | 2013080009 | | 5/2013 |
| JP | 2015138145 | | 7/2015 |
| JP | 2015194517 | | 11/2015 |
| JP | 2015197451 | A1 * | 11/2015 |

* cited by examiner

*Primary Examiner* — Jennifer Doan
(74) *Attorney, Agent, or Firm* — JCIPRNET

(57) ABSTRACT

In an optical modulator, a light-receiving element, and an output port are disposed in a substrate. In addition, at least a part of an electrical line, which electrically connects the light-receiving element and the output port to each other, is formed in the substrate. In addition, a plurality of the optical modulation sections are provided. In addition, among a plurality of the light-receiving elements which are provided to the optical modulation sections, at least one light-receiving element is disposed at a position different from positions of the other light-receiving elements in a light wave propagating direction. A plurality of the output ports are disposed in an arrangement in the light wave propagating direction in correspondence with an arrangement of the plurality of the light-receiving elements in the light wave propagating direction.

2 Claims, 4 Drawing Sheets

OPTICAL MODULATOR

CROSS-REFERENCE TO RELATED APPLICATION

This application claims the priority benefit of Japan application serial no. 2016-061202, filed on Mar. 25, 2016. The entirety of the above-mentioned patent application is hereby incorporated by reference herein and made a part of this specification.

BACKGROUND OF THE INVENTION

Field of the Invention

The present invention relates to an optical modulator, and particularly, to an optical modulator including a substrate having an electro-optic effect, an optical waveguide that is formed in the substrate, and a modulation electrode for modulating a light wave that propagates through the optical waveguide.

Description of Related Art

In an optical communication field or an optical measurement field, various kinds of optical modulators such as an intensity modulator and a phase modulator, which includes a Mach-Zehnder type optical waveguide, have been used. An intensity variation of light, which is output from the Mach-Zehnder type optical waveguide, shows, for example, sinusoidal function characteristics with respect to a voltage that is applied to a modulation electrode. It is necessary to set a modulation signal, which is applied to the modulation electrode, to an appropriate operation bias point so as to obtain an optimal intensity of output light in accordance with a usage of the optical modulator.

According to this, in the related art, monitoring of an intensity state of output light of the optical modulator has been performed by detecting a part of an optical signal, which is output from the optical modulator, or radiated light that is radiated from a multiplexing section of the Mach-Zehnder type optical waveguide, as monitoring light with a light-receiving element such as an optical detector. In addition, an operation bias point of the modulation signal, which is applied to the modulation electrode, is adjusted (bias-controlled) on the basis of a detected value (monitoring output) of the light-receiving element.

With regard to the optical modulator as described above, various inventions have been suggested before now.

For example, Japanese Laid-open Patent Publication No. 2015-138145 discloses an optical modulator configured to enhance light-receiving sensitivity of the light-receiving element and to suppress a decrease in a frequency band of the light-receiving element even in a case where the light-receiving element is disposed on a substrate. In addition, Japanese Laid-open Patent Publication No. 2015-194517 discloses an optical modulator configured to suppress a decrease in a frequency band of a light-receiving element even in a case where two kinds of radiated light from the multiplexing section of the Mach-Zehnder type optical waveguide are simultaneously received and are monitored.

SUMMARY OF THE INVENTION

Along with the high capacity required for communications in recent years, an optical modulator having a structure, in which a plurality of optical modulation sections are provided in one substrate and optical modulation is performed by applying a modulation signal different for each of the optical modulation sections to the modulation electrode, has been developed. In addition, a multi-element structure optical modulator, which includes a plurality of substrates respectively provided with a plurality of optical modulation sections, has also been developed. The optical modulator has a configuration in which a plurality of light-receiving elements are disposed in each of the substrates and monitoring light is detected for each of the optical modulation sections so as to independently perform a bias control for a modulation signal in each of optical modulation sections.

In addition, an increase in frequency of a light-receiving band of a light-receiving element is in progress in accordance with an increase in communication speed. It is necessary to wire electrical lines, through which a light-receiving signal output from the light-receiving element propagates, as short as possible so as to secure a light-receiving band corresponding to the high-speed communication. However, when the electrical lines are shortly wired in a structure in which a plurality of the light-receiving elements are disposed on a substrate, the degree of freedom of wiring is small, and thus a plurality of sites, in which wirings of the electrical lines intersect (cross) each other on the substrate, may occur. Electrical crosstalk is likely to occur in the vicinity of the sites in which wirings of the electrical lines intersect each other, and thus there is a concern that noise may be included in a light-receiving signal that propagates through the electrical lines.

The invention provides an optical modulator capable of suppressing occurrence of a site in which wirings of electrical lines intersect each other on a substrate.

An optical modulator of the invention has the following technical characteristics.

(1) According to an aspect of the invention, there is provided an optical modulator including a substrate in which an optical waveguide is formed, and an optical modulation section that modulates a light wave that propagates through the optical waveguide. A light-receiving element that receives the light wave propagating through the optical waveguide, and an output port that outputs a light-receiving signal output from the light-receiving element to an outer side of the substrate are disposed in the substrate. At least a part of an electrical line, which electrically connects the light-receiving element and the output port to each other, is formed in the substrate. A plurality of the optical modulation sections are provided. The light-receiving element, the output port, and the electrical line are provided to each of at least the optical modulation sections. Among a plurality of the light-receiving elements which are provided to the optical modulation sections, at least one light-receiving element is disposed at a position different from positions of the other light-receiving elements in a light wave propagating direction. A plurality of the output ports are disposed in an arrangement in the light wave propagating direction in correspondence with an arrangement of the plurality of the light-receiving elements in the light wave propagating direction.

(2) In the optical modulator according to (1), the optical waveguide may include a plurality of optical waveguide portions in parallel to each other, at least one of the light-receiving elements may be disposed across two adjacent optical waveguide portions, and a first light-receiving section that receives a light wave propagating through the one of the two adjacent optical waveguide portions, and a second light-receiving section that receives a light wave propagating through the other one of the two adjacent optical waveguide portions may be provided in one light-receiving element.

The optical modulator according to the aspect of the invention includes a substrate in which an optical waveguide is formed, and an optical modulation section that modulates a light wave that propagates through the optical waveguide. A light-receiving element that receives the light wave propagating through the optical waveguide, and an output port that outputs a light-receiving signal output from the light-receiving element to an outer side of the substrate are disposed in the substrate. At least a part of an electrical line, which electrically connects the light-receiving element and the output port to each other, is formed in the substrate. A plurality of the optical modulation sections are provided. The light-receiving element, the output port, and the electrical line are provided to each of at least the optical modulation sections. Among a plurality of the light-receiving elements which are provided to the optical modulation sections, at least one light-receiving element is disposed at a position different from positions of the other light-receiving elements in a light wave propagating direction. A plurality of the output ports are disposed in an arrangement in the light wave propagating direction in correspondence with an arrangement of the plurality of the light-receiving elements in the light wave propagating direction. Accordingly, it is possible to provide an optical modulator capable of suppressing occurrence of a site in which wirings of electrical lines intersect each other on a substrate.

DETAILED DESCRIPTION OF THE INVENTION

Hereinafter, an optical modulator according to the invention will be described in detail.

Figure 1:
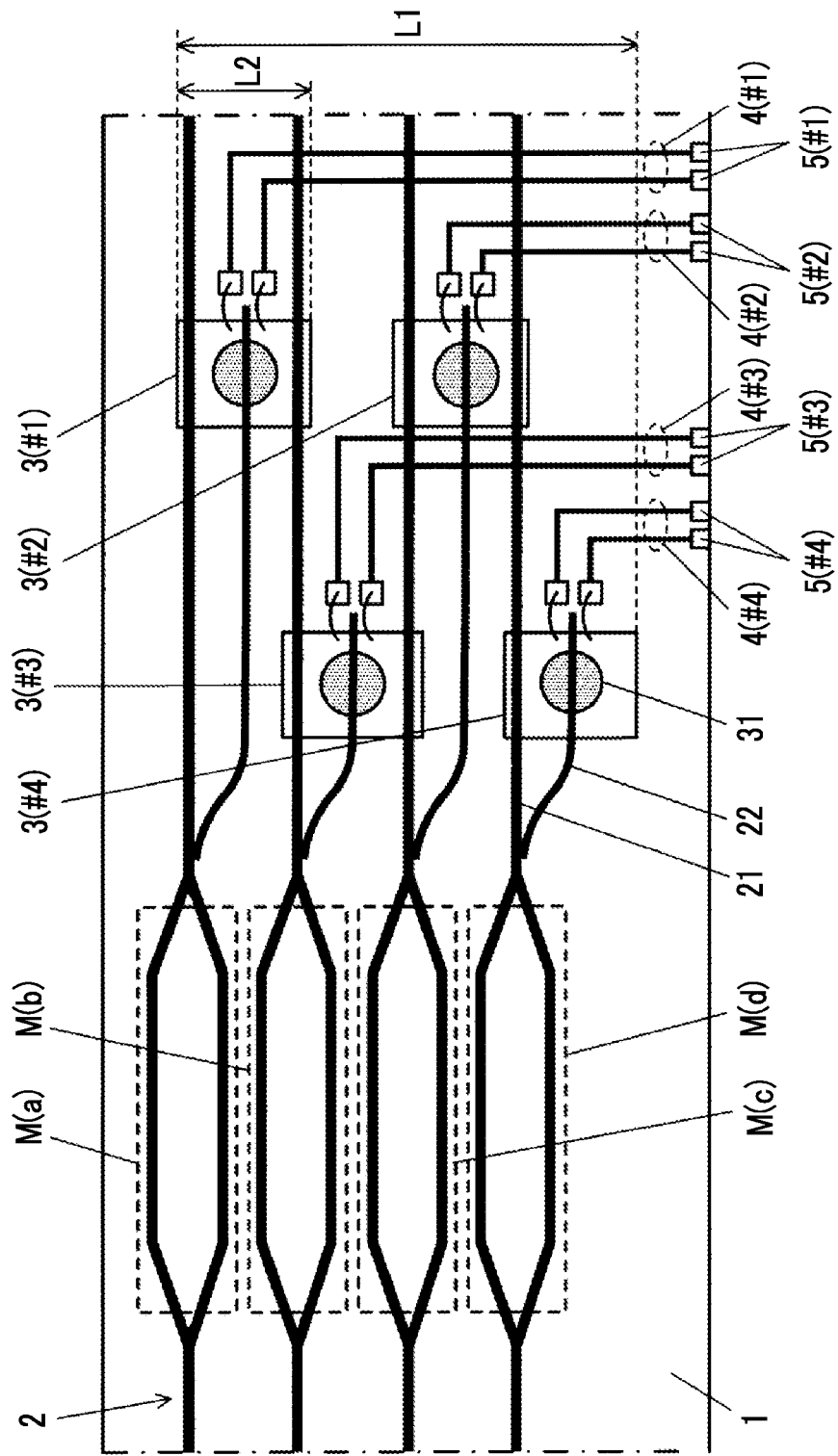
FIG. 1 is a plan view illustrating a first example of an optical modulator according to the invention.
Figure 2:
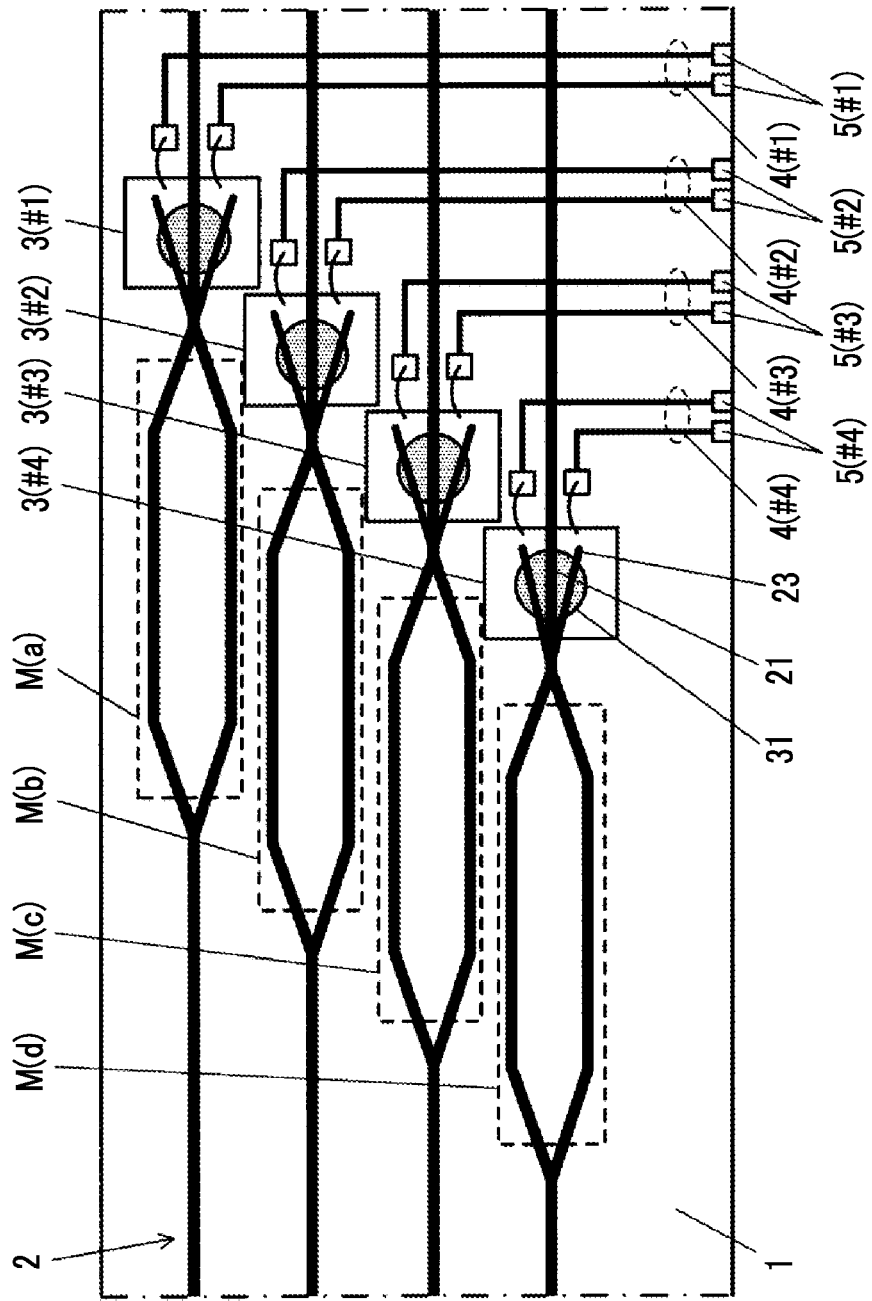
FIG. 2 is a plan view illustrating a second example of the optical modulator according to the invention.
Figure 3:
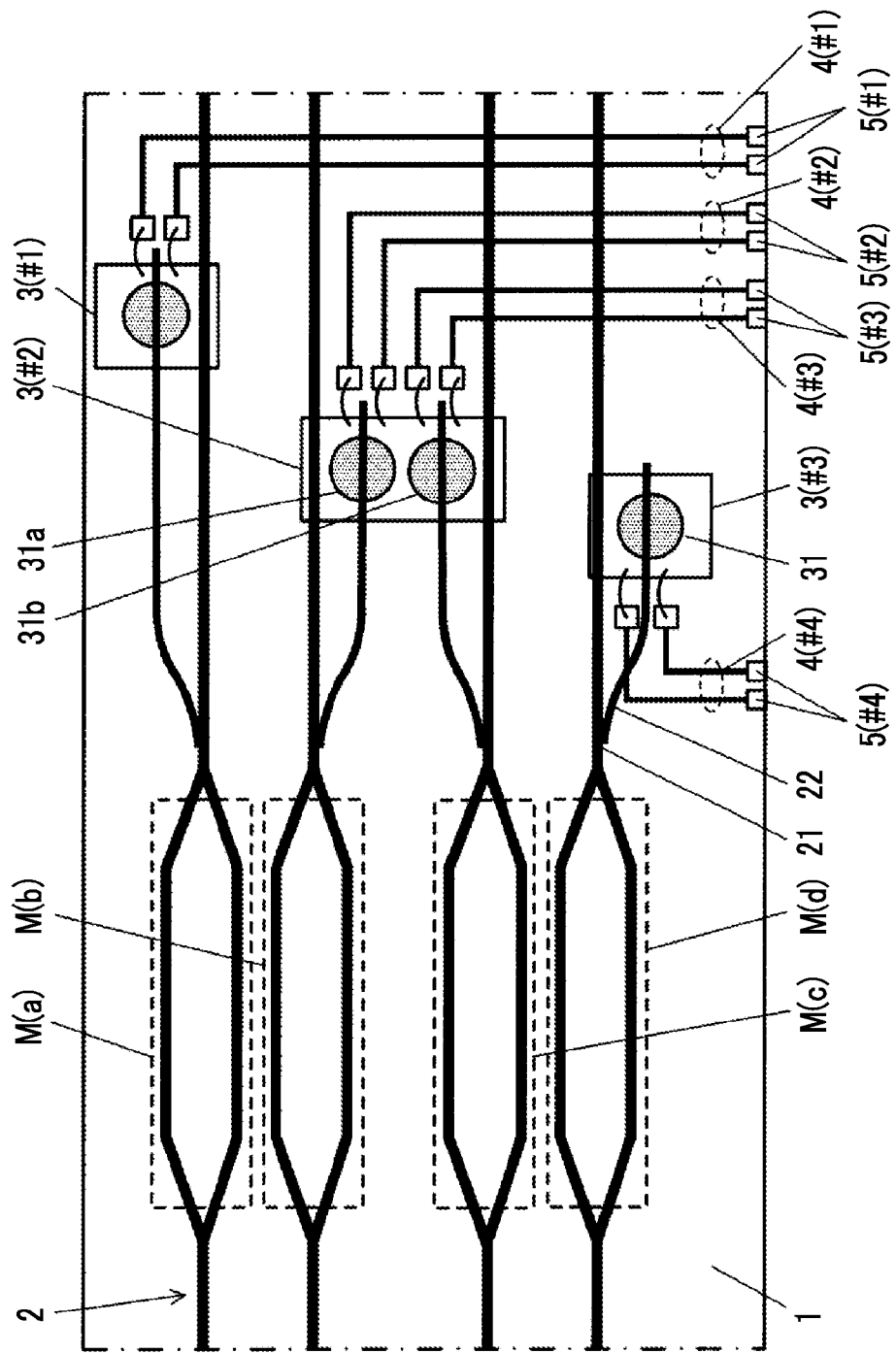
FIG. 3 is a plan view illustrating a third example of the optical modulator according to the invention.

As illustrated in FIG. 1 to FIG. 3, the optical modulator of the invention relates to an optical modulator including a substrate 1 in which an optical waveguide 2 is formed, and an optical modulation section M that modulates a light wave that propagates through the optical waveguide 2.

In the optical modulator, a light-receiving element 3 that receives the light wave propagating through the optical waveguide 2, and an output port 5 that outputs a light-receiving signal output from the light-receiving element 3 to an outer side of the substrate 1 are disposed in the substrate 1. In addition, at least a part of an electrical line 4, which electrically connects the light-receiving element 3 and the output port 5 to each other, is formed in the substrate 1. In addition, a plurality of the optical modulation sections M are provided. The light-receiving element 3, the output port 5, and the electrical line 4 are provided to each of at least the optical modulation sections M. In addition, among a plurality of the light-receiving elements 3 which are provided to the optical modulation sections M, at least one light-receiving element 3 is disposed at a position different from positions of the other light-receiving elements 3 in a light wave propagating direction. In addition, a plurality of the output ports 5 are disposed in an arrangement in the light wave propagating direction in correspondence with an arrangement of the plurality of the light-receiving elements 3 in the light wave propagating direction.

FIG. 1 is a plan view illustrating a first example of the optical modulator according to the invention.

Examples of the substrate 1 include a substrate such as quartz and a semiconductor in which an optical waveguide can be formed, and a substrate that has an electro-optic effect and uses anyone single crystal in lithium niobate ($LiNbO_3$), lithium tantalate ($LiTaO_3$), and lead lanthanum zirconate titanate (PLZT), and the like.

For example, the optical waveguide 2, which is formed in the substrate 1, is formed by thermally diffusing a high-refractive-index material such as titanium (Ti) on a $LiNbO_3$ substrate (LN substrate). In addition, it is possible to use a rib-type optical waveguide in which a groove is formed on both sides of a portion that becomes an optical waveguide, or a ridge-type waveguide in which an optical waveguide portion is famed in a convex shape. In addition, the invention is also applicable to an optical circuit in which an optical waveguide is formed in substrates such as PLCs different from each other, and the substrates are joined and integrated.

A modulation electrode (not illustrated), which modulates a light wave that propagates through the optical waveguide 2, is provided in the substrate 1. The modulation electrode is constituted by a signal electrode or a ground electrode, and is formed by a gold plating method in which an electrode pattern of Ti and Au is formed on a substrate surface, and the like. In addition, a buffer layer such as dielectric $SiO_2$ may be provided on the substrate surface after forming the optical waveguide as necessary. Furthermore, when forming the buffer layer in a region that guides an optical signal, which propagates through the inside of the substrate 1 (optical waveguide 2), toward a light-receiving element 3, it is difficult to effectively guide the optical signal. Accordingly, it is preferable not to form the buffer layer in the region. In addition, in a case of disposing the light-receiving element 3 through the buffer layer, it is preferable that the thickness of the buffer layer in the region, in which the light-receiving element 3 is disposed, is made to be smaller than the thickness of other regions so as to secure light-receiving sensitivity.

The light-receiving element 3 may be brought into direct contact with the optical waveguide 2, but it is preferable to form a high-refractive-index film on the optical waveguide 2 and to dispose the light-receiving element 3 on the high-refractive-index film so as to effectively extract light (evanescent wave) that is radiated from the optical waveguide 2. In this case, it is necessary to set a refractive index of the high-refractive-index film to be higher than a refractive index of the optical waveguide 2 and lower than a refractive index of a light-receiving element substrate. In addition, for example, as disclosed in Japanese Laid-open Patent Publication No. 2013-80009, a groove or a reflective member may be disposed in the substrate 1 (or the optical waveguide 2 and the like), and a part of an optical signal may be guided to the light-receiving element side through reflection.

The optical modulator of this example includes four optical modulation sections M(a) to M(d), which apply a modulation signal to the modulation electrode and perform optical modulation, in parallel to each other. The optical modulation sections M(a) to M(d) perform optical modulation by using modulation signals different from each other, and are constituted to independently perform a bias control of the modulation signals. In the configuration in which the optical modulation sections are provided in parallel to each other, it is not required for positions in a light wave propagating direction (right and left direction in FIG. 1) to match each other, and the positions in the light wave propagating direction may deviate from each other.

Furthermore, the optical modulation sections which perform optical modulation by using modulation signals different from each other are not limited to the optical modulation sections each being formed with one Mach-Zehnder type optical waveguide similar to this example. That is, for example, it is possible to use optical modulation sections having various shapes such as an optical modulation section formed as a nest-type optical waveguide in which two Mach-Zehnder type optical waveguides are disposed in a nest shape, and an optical modulation section in which two nest-type optical waveguides are additionally disposed in a nest shape.

The substrate 1 is provided with a light-receiving element 3 that receives a light wave, which propagates through the optical waveguide 2, with a light-receiving section 31, an output port 5 that outputs the light-receiving signal output from the light-receiving element 3 to an outer side of the substrate 1, and at least a part of an electrical line 4 that electrically connects the light-receiving element 3 and the output port 5 in correspondence with each of the optical modulation sections M. In this example, as the substrate 1, a substrate having a thickness of 20 μm or less is used, but the thickness of the substrate is arbitrarily set.

In this example, a first light-receiving system, which includes a light-receiving element 3(#1), an electrical line 4(#1), an output port 5(#1), is provided with respect to an optical modulation section M(a). In addition, a second light-receiving system, which includes a light-receiving element 3(#2), an electrical line 4(#2), an output port 5(#2), is provided with respect to an optical modulation section M(c). In addition, a third light-receiving system, which includes a light-receiving element 3(#3), an electrical line 4(#3), an output port 5(#3), is provided with respect to an optical modulation section M(b). In addition, a fourth light-receiving system, which includes a light-receiving element 3(#4), an electrical line 4(#4), an output port 5(#4), is provided with respect to an optical modulation section M(d).

Each of the light-receiving elements 3 detects a part of an optical signal, which propagates through an output waveguide 21 of each of the optical modulation sections M and is output from the optical modulator, as monitoring light. Furthermore, as will be described later with reference to FIG. 2, radiated light, which is radiated from a multiplexing section of each Mach-Zehnder type optical waveguide that constitutes the optical modulation section M, may be detected as the monitoring light. In addition, in a case where the substrate has a certain degree of thickness, it is also possible to employ a configuration in which the light-receiving element 3 is buried in the substrate.

In this example, a monitoring waveguide 22, which extracts a part of the optical signal propagating through the output waveguide 21, is provided with respect to the output waveguide 21 of each of the optical modulation sections M. The monitoring waveguide 22 is formed to guide an optical signal extracted from the output waveguide 21 to a corresponding light-receiving element 3.

That is, the light-receiving element 3 in this example is configured to detect a part of an optical signal that is modulated in a corresponding optical modulation section M as the monitoring light. Furthermore, the light-receiving element 3 may be disposed to overlap the output waveguide 21, and a groove or a reflective member may be provided at apart of a cross-section of the output waveguide 21 to directly extract a part of an optical signal output from the output waveguide 21 and to receive the extracted optical signal with the light-receiving element 3.

Each light-receiving signal, which is output from the light-receiving element 3, propagates through the electrical line 4 that is connected to the light-receiving element 3, reaches the output port 5, and is output from the output port 5 to an outer side of the substrate 1.

In this example, the entirety of sections of a plurality of the electrical lines 4 is formed on the substrate 1, but a partial section may be formed to be separated from the substrate 1.

In the invention, so as to secure a light-receiving band of the light-receiving element 3 when a reduction in size of the optical modulator progresses, arrangement of the light-receiving element 3 and the output port 5 is devised to suppress occurrence of a site at which the electrical lines 4 intersect each other while forming wirings of the electrical lines 4 to be as short as possible.

That is, in the optical modulator according to the invention, so as to shorten a length L1 of a light-receiving element portion in a width direction of the substrate 1, among the light-receiving elements 3 provided with respect to the optical modulation sections M, at least one light-receiving element 3 is disposed at a position different from positions of the other light-receiving elements 3 in the light wave propagating direction. Here, the width direction represents a direction that is perpendicular to the light wave propagating direction and is parallel to a surface of the substrate 1, and is a vertical direction in FIG. 1. Each of the light-receiving elements 3 has a certain degree of length in the width direction. Accordingly, in a case where positions of the light-receiving elements 3 in the light wave propagating direction are arranged, when the number of the light-receiving elements 3 is set to N, and the length in the width direction is set to L2, the length L1 of the substrate 1 in the width direction satisfies a relationship of L1=L2×N.

In contrast, in the optical modulator according to the invention, at least one light-receiving element 3 is disposed at a position different from positions of the other light-receiving elements 3 in the light wave propagating direction, and thus the length L1 of the substrate 1 in the width direction can be shortened to L2×N or less.

In addition, in the optical modulator according to the invention, a plurality of the output ports 5 are disposed in an arrangement in the light wave propagating direction in correspondence with an arrangement of the light-receiving elements 3 in the light wave propagating direction. According to this, it is possible to shorten a wiring of the electrical line 4 that connects each of the light-receiving element 3 and each of the output ports 5, and it is possible to reduce a site at which the electrical lines 4 intersect each other.

Description will be given of a specific arrangement of the light-receiving element 3, the electrical line 4, and the output port 5 with reference to FIG. 1.

In FIG. 1, the output port 5 is disposed at one edge (edge on a lower side in the drawing) between edges of the substrate 1 along the light wave propagating direction. In addition, the light-receiving elements 3 are disposed in the order of light-receiving elements 3(#1), 3(#3), 3(#2), and 3(#4) from an edge (edge on an upper side in the drawing) that is opposite to an output port side.

The light-receiving elements 3 are disposed in such a manner that adjacent light-receiving elements are disposed at positions different from each other in the light wave propagating direction so as to shorten the length of the substrate 1 in the width direction. In addition, among the light-receiving elements 3, the light-receiving element 3(#1) and the light-receiving element 3(#2) are disposed at positions in the light wave propagating direction which deviate toward a downstream side in the light wave propagating direction from positions of the light-receiving element 3(#3) and the light-receiving element 3(#4) in the light wave propagating direction.

In correspondence with the disposition, the output ports are disposed in an arrangement in which the output port 5(#1) and the output port 5(#2) are disposed at positions on a downstream side of positions of the output port 5(#3) and the output port 5(#4) in the light wave propagating direction.

In addition, in a case where a plurality of the light-receiving elements 3, in which positions in the light wave propagating direction are the same as each other, exist, an output port 5 with respect to a light-receiving element 3, which is closer to an edge on an output port side, is disposed at a position that is closer to a light-receiving element side. For example, in the light-receiving element 3(#1) and the light-receiving element 3(#2), the light-receiving element 3(#2) is closer to the edge on the output port side, and thus the output port 5(#2) is disposed at a position that is closer to the light-receiving element side.

According to this configuration, it is possible to employ a simple wiring in which each of the electrical lines 4 is allowed to extend in the light wave propagating direction from the light-receiving element 3 and is allowed to extend toward an output port direction. According to this, it is possible to suppress occurrence of a site at which wirings of the electrical lines 4 intersect each other on the substrate 1, and it is possible to shorten the wirings of the electrical lines 4.

FIG. 2 is a plan view illustrating a second example of the optical modulator according to the invention.

In this example, a first light-receiving system, which includes a light-receiving element 3(#1), an electrical line 4(#1), and an output port 5(#1), is provided with respect to an optical modulation section M(a). In addition, a second light-receiving system, which includes a light-receiving element 3(#2), an electrical line 4(#2), and an output port 5(#2), is provided with respect to an optical modulation section M(b). In addition, a third light-receiving system, which includes a light-receiving element 3(#3), an electrical line 4(#3), and an output port 5(#3), is provided with respect to an optical modulation section M(c). In addition, a fourth light-receiving system, which includes a light-receiving element 3(#4), an electrical line 4(#4), and an output port 5(#4), is provided with respect to an optical modulation section M(d).

Furthermore, as the optical modulation sections M, it is possible to employ optical modulation sections having various shapes such as an optical modulation section formed with one Mach-Zehnder type optical waveguide, an optical modulation section formed as a nest-type optical waveguide in which two Mach-Zehnder type optical waveguides are disposed in a nest shape, and an optical modulation section in which two nest-type optical waveguides are additionally disposed in a nest shape.

In addition, in this example, a radiated-light waveguide 23, which guides radiated light that is radiated from a multiplexing section of an Mach-Zehnder type optical waveguide that constitutes each of the optical modulation sections M, is provided on both sides of an output waveguide 21 of the optical modulation section M, and each of the light-receiving element 3 is disposed to cover the output waveguide 21 and the radiated-light waveguide 23.

That is, the light-receiving element 3 in this example is configured to detect radiated light from the multiplexing section of the Mach-Zehnder type optical waveguide, which constitutes a corresponding optical modulation section M, as monitoring light.

Furthermore, a low-refractive-index structure (structure having a refractive index lower than that of the output waveguide) is provided between the output waveguide 21 and the light-receiving element 3 to suppress incidence of an optical signal, which propagates through the output waveguide, into the light-receiving element. Examples of the low-refractive-index structure include a structure in which a film such as $SiO_2$ is disposed, a structure in which an air layer is interposed, and the like.

In FIG. 2, each of the output ports 5 is disposed at one edge (edge on a lower side in the drawing) between edges of the substrate 1 along the light wave propagating direction. In addition, the light-receiving elements 3 are disposed in the order of light-receiving elements 3(#1), 3(#2), 3(#3), and 3(#4) from an edge (edge on an upper side in the drawing) that is opposite to an output port side.

The light-receiving elements 3 are disposed in such a manner that all positions in the light wave propagating direction are different from each other so as to shorten the length of the substrate 1 in the width direction. Specifically, the light-receiving elements 3(#4), 3(#3), 3(#2), and 3(#1) are disposed to deviate from each other in this order from an upstream side to a downstream side in a light propagating direction.

In correspondence with the disposition, the output ports are disposed in an arrangement in which the output ports 5(#4), 5(#3), 5(#2), and 5(#1) are disposed in this order from an upstream side to a downstream side in the light propagation direction.

Even in this configuration, it is possible to employ a simple wiring in which each of the electrical lines 4 is allowed to extend in the light wave propagating direction from the light-receiving element 3 and is allowed to extend toward an output port direction. According to this, it is possible to suppress occurrence of a site at which wirings of the electrical lines 4 intersect each other on the substrate 1, and it is possible to shorten the wirings of the electrical lines 4. Electrical crosstalk, which may be caused by the arrangement, can be suppressed through disposition of crosstalk suppression means between the electrical lines 4(#1) to 4(#4) which are parallel to each other. As the crosstalk suppression means, it is possible to use a metal member that is connected to a casing of the optical modulator and is grounded, and the like.

FIG. 3 is a plan view illustrating a third example of the optical modulator according to the invention.

In this example, a first light-receiving system, which includes a light-receiving element 3(#1), an electrical line 4(#1), and an output port 5(#1), is provided with respect to an optical modulation section M(a). In addition, a second light-receiving system, which includes a light-receiving element 3(#2), an electrical line 4(#2), and an output port 5(#2), is provided with respect to an optical modulation section M(b). In addition, a third light-receiving system, which includes a light-receiving element 3(#2), an electrical line 4(#3), and an output port 5(#3), is provided with respect to an optical modulation section M(c). In addition, a fourth light-receiving system, which includes a light-receiving element 3(#3), an electrical line 4(#4), and an output port 5(#4), is provided with respect to an optical modulation section M(d).

Furthermore, as the optical modulation sections M, it is possible to employ optical modulation sections having various shapes such as an optical modulation section formed with one Mach-Zehnder type optical waveguide, an optical modulation section formed as a nest-type optical waveguide in which two Mach-Zehnder type optical waveguides are disposed in a nest shape, and an optical modulation section in which two nest-type optical waveguides are additionally disposed in a nest shape.

In addition, in this example, as is the case with the first example (FIG. 1), a monitoring waveguide 22, which extracts a part of an optical signal that propagates through an output waveguide 21, is provided with respect to the output waveguide 21 of each of the optical modulation sections M. The monitoring waveguide 22 is formed to guide an optical signal, which is extracted from the output waveguide 21, to a corresponding light-receiving element 3.

That is, the light-receiving element 3 in this example is configured to detect a part of an optical signal that is modulated in a corresponding optical modulation section M as the monitoring light. Furthermore, the light-receiving element 3 may be disposed to overlap the output waveguide 21, and a groove or a reflective member may be provided at a part of a cross-section of the output waveguide 21 to directly extract a part of an optical signal output from the output waveguide 21 and to receive the extracted optical signal with the light-receiving element 3.

In addition, in this example, one light-receiving element 3(#2) is configured to be shared by the optical modulation section M(b) and the optical modulation section M(c). Specifically, the monitoring waveguide 22 with respect to the optical modulation section M(b) and the monitoring waveguide 22 with respect to the optical modulation section M(c) are formed in parallel to each other, and the light-receiving element 3(#2) is disposed straddling the waveguide portions. In the light-receiving element 3(#2), a first light-receiving section 31a that receives a light wave that propagates through the monitoring waveguide 22 with respect to the optical modulation section M(b), and a second light-receiving section 31b that receives a light wave that propagates through the monitoring waveguide 22 with respect to the optical modulation section M(c) are provided in one light-receiving element. Furthermore, in the configuration in which the monitoring waveguides 22 are formed in parallel to each other, it is not required for positions in a light wave propagating direction (right and left direction in FIG. 3) to match each other, and the positions in the light wave propagating direction may deviate from each other. However, it is preferable to have an overlapping section to a certain extent in which one light-receiving element 3 can be shared.

As described above, according to a configuration in which a plurality of light waves are received with one light-receiving element 3, it is possible to reduce the number of light-receiving elements on a substrate, and thus the configuration is effective for a reduction in size of the substrate.

In FIG. 3, each of the output ports 5 is disposed at one edge (edge on a lower side in the drawing) between edges of the substrate 1 along the light wave propagating direction. In addition, the light-receiving elements 3 are disposed in the order of light-receiving elements 3(#1), 3(#2), and 3(#3) from an edge (edge on an upper side in the drawing) that is opposite to an output port side.

The light-receiving elements 3 are disposed in such a manner that all positions in the light wave propagating direction are different from each other so as to shorten the length of the substrate 1 in the width direction. Specifically, the light-receiving elements 3(#3), 3(#2), and 3(#1) are disposed to deviate from each other in this order from an upstream side to a downstream side in a light propagating direction.

In correspondence with the disposition, the output ports are disposed in an arrangement in which the output ports 5(#4), 5(#3), 5(#2), and 5(#1) are disposed in this order from an upstream side to a downstream side in the light propagation direction.

The electrical line 4(#4) with respect to the light-receiving element 3(#3) that is closest to the edge on the output port side is connected to the light-receiving element 3 from a position that is different from positions of the electrical lines 4(#1) to 4(#3) with respect to the other light-receiving elements 3(#1) and 3(#2) in the light wave propagating direction. That is, the electrical lines 4(#1) to 4(#3) are connected to a downstream side of the light-receiving element 3 in the light propagating direction. In contrast, the electrical line 4(#4) is connected to an upstream side of the light-receiving element 3 in the light propagating direction.

Even in this configuration, it is possible to employ a simple wiring in which each of the electrical lines 4 is allowed to extend in the light wave propagating direction from the light-receiving element 3 and is allowed to extend toward an output port direction. According to this, it is possible to suppress occurrence of a site at which wirings of the electrical lines 4 intersect each other on the substrate 1, and it is possible to shorten the wirings of the electrical lines 4.

Hereinbefore, description has been given of an optical modulator in which a plurality of optical modulation sections are provided in one sheet of substrate as an example, but the invention is also applicable to a multi-element structure optical modulator including a plurality of substrates in which a plurality of optical modulation sections are provided.

Figure 4:
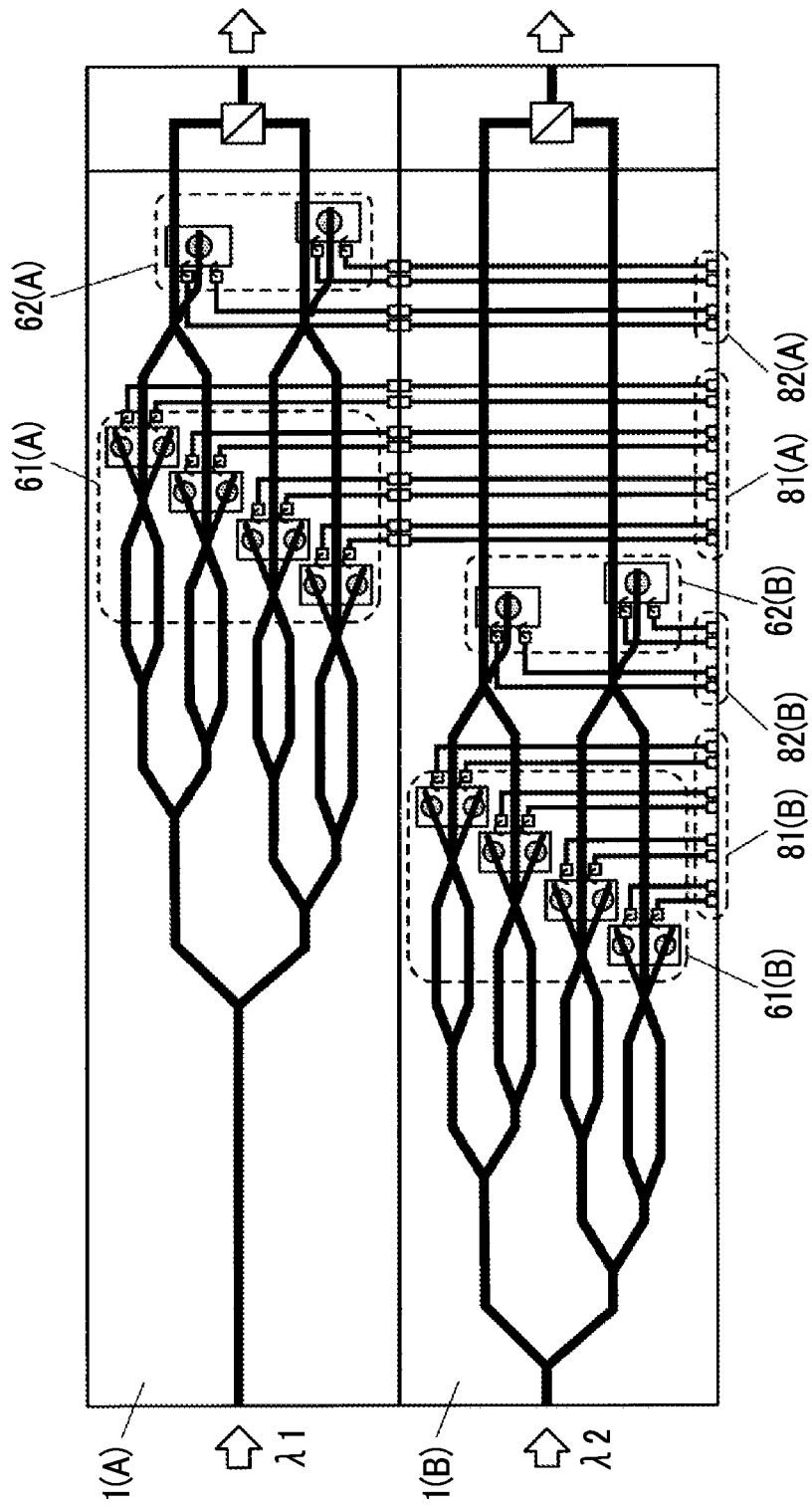
FIG. 4 is a plan view illustrating a fourth example of the optical modulator according to the invention.

FIG. 4 is a plan view illustrating a fourth example of the optical modulator according to the invention.

The optical modulator in the same drawing includes a first substrate 1(A) to which a light wave having a wavelength X1 is input, and a second substrate 1(B) to which a light wave having a wavelength X2 is input. The substrate 1(A) includes two main modulation sections, and the main modulation sections respectively include two sub-modulation sections. In addition, a light-receiving element 61(A) is provided with respect to each of the sub-modulation sections, and a light-receiving element 62(A) is also provided with respect to each of the main modulation section. The light-receiving element 62(A) with respect to the main modulation section is requisite. On the other hand, and the light-receiving element 61(A) with respect to the sub-modulation section may be omitted, but it is preferable to provide the light-receiving element 61(A) so as to perform a more accurate modulation control. The substrate 1(B) also includes the same optical modulation section or the same light-receiving element as in the substrate 1(A).

The substrate 1(B) is provided with output ports 81(B) and 82(B) configured to output light-receiving signals from light-receiving elements 61(B) and 62(B) to an outer side. In addition, the substrate 1(B) is also provided with output ports 81(A) and 82(A) configured to output the light-receiving signals from the light-receiving elements 61(A) and 62(A) on a substrate 1(A) side to an outer side. That is, the light-receiving signals, which are detected in the substrate 1(A), are output to an outer side through the substrate 1(B).

The light-receiving element 61(A) and the output port 81(A), the light-receiving element 62(A) and the output port 82(A), the light-receiving element 61(B) and the output port 81(B), and the light-receiving element 62(B) and the output port 82(B) are respectively connected to each other through an electrical line.

Even in this multi-element structure optical modulator, in a case where light-receiving elements are disposed at positions different from each other in the light wave propagating direction, when output ports are disposed in an arrangement corresponding to the disposition, it is possible to simplify a wiring of the electrical line that electrically connects each of the light-receiving element and each of the output port. According to this, it is possible to suppress occurrence of a site at which wirings of the electrical lines intersect each other on the substrate, and it is possible to shorten the wirings of the electrical lines.

Furthermore, FIG. 4 illustrates a configuration in which the light-receiving elements 61(A) and 61(B) receive radiated light that propagates through a radiated-light waveguide, and the light-receiving elements 62(A) and 62(B) receive monitoring light that propagates through a monitoring waveguide, but it is needless to say that there is no limitation to the configuration. That is, it is possible to employ a configuration in which the light-receiving elements 61(A) and 61(B) receive a part of an optical signal that propagates through an output waveguide or monitoring light that propagates through the monitoring waveguide. In addition, the light-receiving elements 62(A) and 62(B) may be configured to receive a part of an optical signal that propagates through the output waveguide, or radiated-light that propagates through the radiated-light waveguide.

Hereinbefore, the invention has been described on the basis of examples. However, the invention is not limited to the above description, and it is needless to say that appropriate design modifications can be made in a range not departing from the gist of the invention.

As described above, according to the invention, it is possible to provide an optical modulator capable of suppressing occurrence of a site at which wirings of electrical lines intersect each other on a substrate.

What is claimed is:

1. An optical modulator, comprising:
a substrate in which an optical waveguide is formed; and
an optical modulation section that modulates a light wave that propagates through the optical waveguide,
wherein a light-receiving element that receives the light wave propagating through the optical waveguide, and an output port that outputs a light-receiving signal output from the light-receiving element to an outer side of the substrate are disposed in the substrate,
at least a part of an electrical line, which electrically connects the light-receiving element and the output port to each other, is formed in the substrate,
a plurality of the optical modulation sections are provided,
the light-receiving element, the output port, and the electrical line are provided to each of at least the optical modulation sections,
among a plurality of the light-receiving elements which are provided to the optical modulation sections, at least one light-receiving element is disposed at a position different from positions of the other light-receiving elements in a light wave propagating direction, and
a plurality of the output ports are disposed in an arrangement in the light wave propagating direction in correspondence with an arrangement of the plurality of the light-receiving elements in the light wave propagating direction.

2. The optical modulator according to claim 1,
wherein the optical waveguide includes a plurality of optical waveguide portions in parallel to each other,
at least one of the light-receiving elements is disposed across two adjacent optical waveguide portions, and
a first light-receiving section that receives a light wave propagating through the one of the two adjacent optical waveguide portions, and a second light-receiving section that receives a light wave propagating through the other one of the two adjacent optical waveguide portions are provided in one light-receiving element.

* * * * *